(No Model.) 4 Sheets—Sheet 1.
J. J. FAULKNER.
COTTON SEED LINTING MACHINE.
No. 462,632. Patented Nov. 3, 1891.
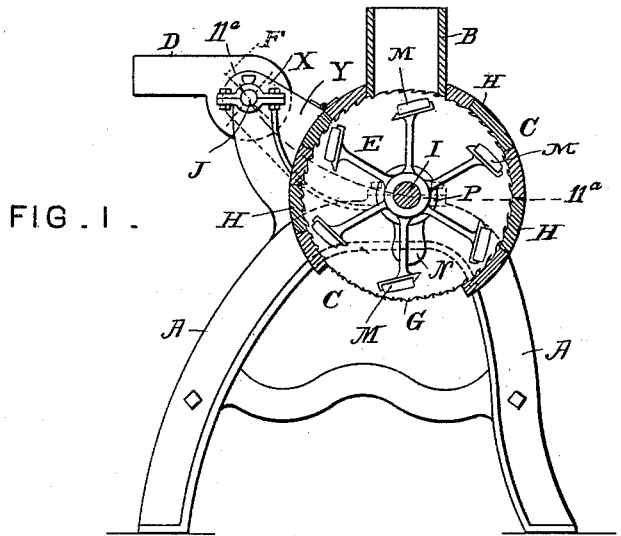
FIG. I.
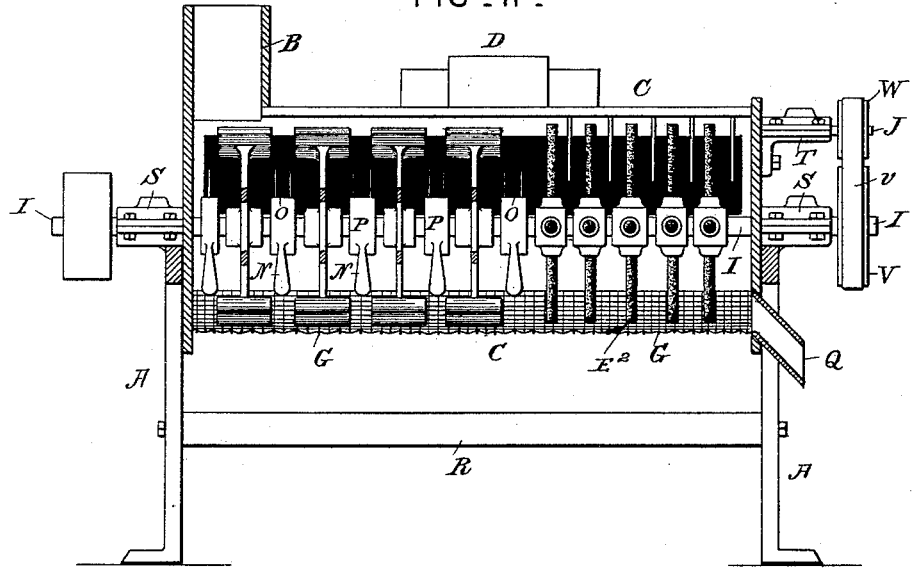
FIG. II.
Attest:
Geo. T. Smallwood.
Geo. E. Cruse.
Inventor:
James J. Faulkner.
By Knight Bro. attys.

(No Model.) 4 Sheets—Sheet 2.
J. J. FAULKNER.
COTTON SEED LINTING MACHINE.
No. 462,632. Patented Nov. 3, 1891.
FIG. III.
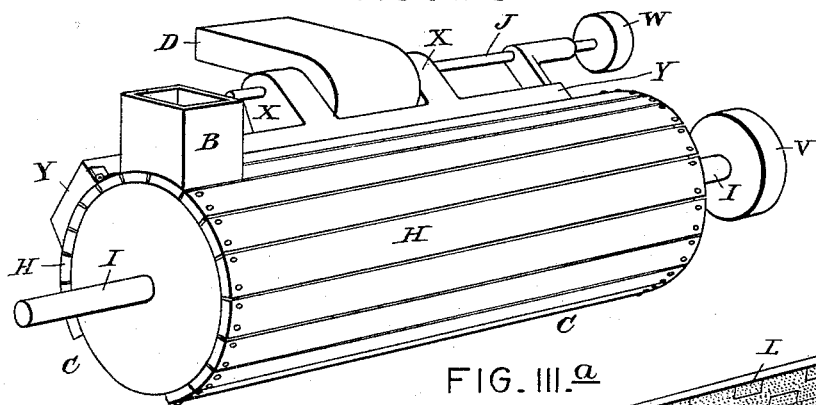
FIG. III.a
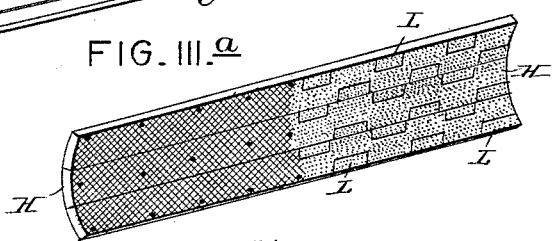
FIG. IV. FIG. V.
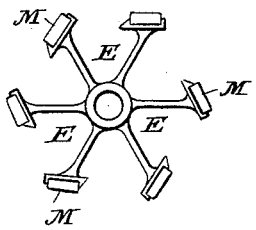
FIG. VI.
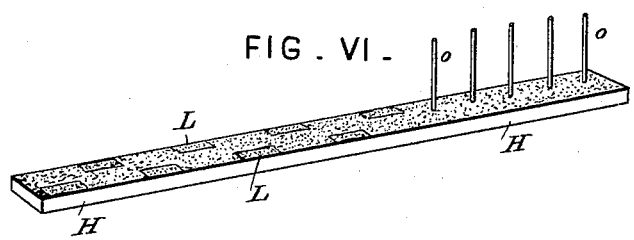
FIG. VII. Inventor:
James J. Faulkner,
Attest:
Geo. T. Smallwood
Geo. E. Cruse
By Knight Bros
Attys.
THE NORRIS PETERS CO., PHOTO-LITHO., WASHINGTON, D. C.

(No Model.) 4 Sheets—Sheet 3.
J. J. FAULKNER.
COTTON SEED LINTING MACHINE.
No. 462,632. Patented Nov. 3, 1891.
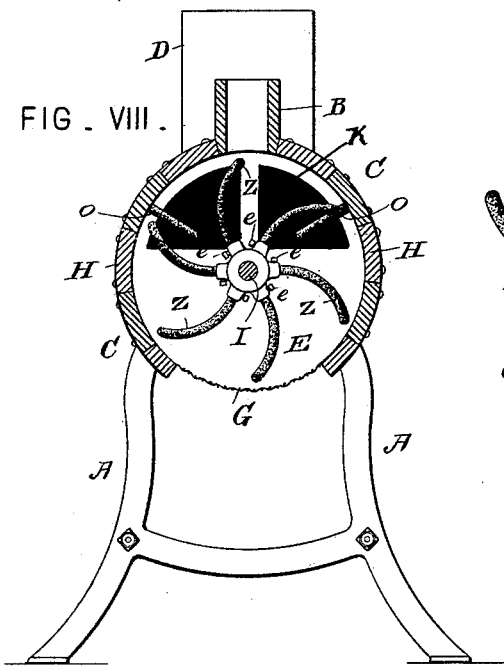
FIG. VIII.
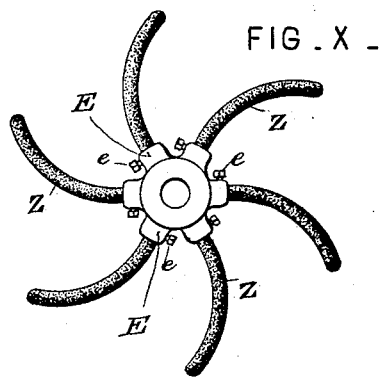
FIG. X.
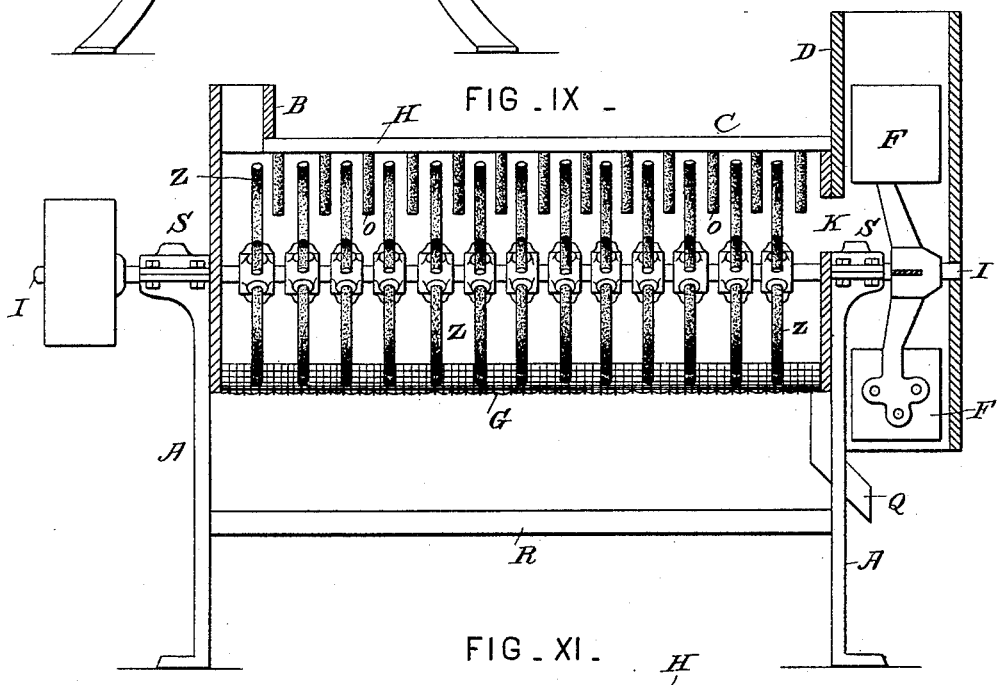
FIG. IX.
FIG. XI.
Attest:
Geo. T. Smallwood,
Geo. E. Cruse.
Inventor:
James J. Faulkner.
By Knight Bros, attys.

(No Model.) 4 Sheets—Sheet 4.
J. J. FAULKNER.
COTTON SEED LINTING MACHINE.
No. 462,632. Patented Nov. 3, 1891.
FIG 11.ª
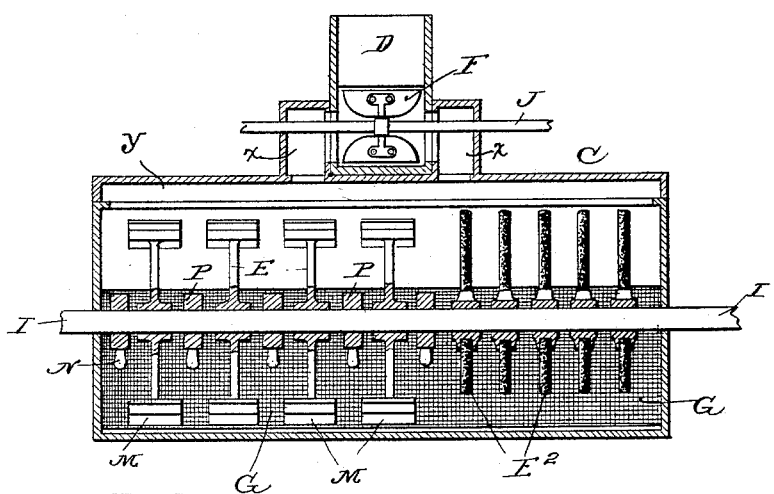
FIG 12.
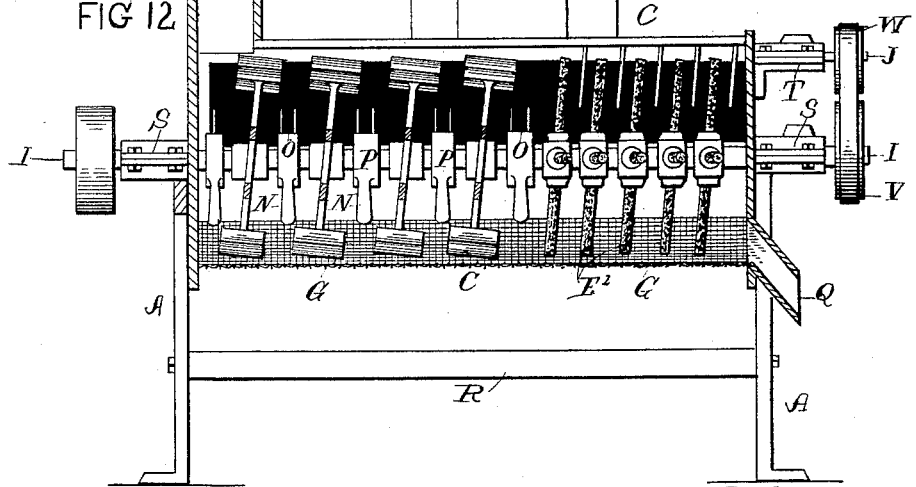
Attest:
Harry S. Rohrer.
F. A. Hopkins.
Inventor:
James J. Faulkner.
By Knight Bros.
Attorneys.

UNITED STATES PATENT OFFICE.

JAMES J. FAULKNER, OF MEMPHIS, TENNESSEE, ASSIGNOR OF TWO-THIRDS TO THE NATIONAL COTTON SEED OIL AND HULLER COMPANY, OF SAME PLACE.

COTTON-SEED-LINTING MACHINE.

SPECIFICATION forming part of Letters Patent No. 462,632, dated November 3, 1891.

Application filed July 2, 1890. Serial No. 357,532. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed-Linting Machines, of which the following is a specification.

My improved machine consists, essentially, in a cylinder horizontal, or nearly so, with fixed rubbing-surfaces projecting inwardly and a shaft carrying rubbing-arms producing friction upon the seed in conjunction with the fixed rubbing-surfaces referred to. The said rotary arms or fixed rubbing-surfaces or both being roughened to assist in stripping the lint or cotton from the seeds. The cylinder or casing is constructed with a screen-bottom for aspiration and to discharge dust, impurities, and fragments of seed, and an exhaust-fan connects with the interior of the cylinder, producing a current of air, by which the cotton is discharged as it is removed from the seed.

The invention further relates to certain details in the construction and arrangement of the rubbing and separating appliances, hereinafter more particularly described.

In the accompanying drawings, Figure I is a vertical transverse section of a machine embodying my invention. Fig. II is a vertical longitudinal section of the same, parts being in elevation. Fig. II$^a$ is an enlarged longitudinal section taken on the line II$^a$ II$^a$, Fig. I. Fig. III is a perspective view of the cylinder and its accessories. Fig. III$^a$ is a perspective view of a portion of the cylinder, illustrating a modification hereinafter described. Fig. IV is a detail view of one of the spiders carrying the rotary rubber arms. Fig. V is a perspective view of the weighted washer and fixed rubber-arms projecting upward therefrom. Fig. VI is a detail view of one of the staves of which the cylinder is partly made up. Fig. VII is a view of one of the rubber-heads detached. Fig. VIII is a transverse section of a machine, illustrating a modification in the construction of the rubber-arms. Fig. IX is a vertical longitudinal section, partly in elevation, of the machine illustrating the said modification. Fig. X is a view of one of the spiders with rubbing-arms attached, such as shown in Figs. VIII and IX. Fig. XI is a view of modified form of one of the staves of the cylinder shown in Figs. VIII and IX. Fig. XII is a further modification, hereinafter described.

A represents the frame of the machine; B, the hopper by which the seed is introduced into the cylinder C.

D is a fan-casing, connected with the interior of the cylinder C by flumes X, covering the eyes of the fan-case and longitudinal flume Y, connecting these with the cylinder.

F represents a fan within the casing D, which thus operates to exhaust air from the interior of the cylinder. The cylinder is made up of the screen-bottom G, through which it is aspirated, and through which dust, motes, and imperfect seeds or fragments thereof are discharged, and a number of staves H, to which are attached the internal fixed rubbing surfaces or arms, hereinafter described. The main shaft I, passing centrally through the cylinder C, carries at one end a number of arms E, which may take the form of a spider, as represented in Figs. I, II, and IV, having on their extremities seats for the rubbers M, Figs. I, II, and VII, made of blocks of wood or other material with a body of emery concrete on the outer surfaces. On the other end or half of the said shaft are a number of whirling arms E$^2$, coated with emery or like abrading substance; or the said rotary spiders may take the form shown in Figs. VIII, IX, and X, in which the arms are shortened and provided with sockets for the reception of separate curved arms Z, made of iron or wood wrapped with strips of cloth or leather and coated with glue and emery, the arms when made of iron being roughened by means of cuts to adapt them to retain the cloth, which is fixed thereon with glue. The said curved arms are fixed in the sockets of the spider by means of set-screws $e$. The fan-shaft J, Figs. I, II, and III, is driven from the main shaft I through the medium of pulleys V W and a belt $v$.

P, Figs. II and V, represent washers of wood or other light material mounted loosely on the shaft I, between the spiders E, having pendent weights N preventing their rotation with the shaft and carrying upwardly-projecting arms o, which serve the purpose of preventing the cotton from wrapping around the shaft, causing its deflection toward the periphery of the cylinder and thus keeping the cylinder from clogging. The entire interior of the cylinder is preferably covered with emery or sand concrete. The fan, if preferred, may be arranged at the end of the cylinder C, as shown in Fig. IX, and coaxially therewith. In either case air-passages are provided from the cylinder to the fan-casing through suitable apertures K, Figs. VIII and IX.

On the inner faces of the staves H, Fig. VI, of which the upper and principal portion of the cylinder is made up, are fixed rubbers, which consist in part of blocks L, of leather or other material coated with emery, and in part of radial arms o, formed of iron roughened on their surfaces and coated with emery, as described with reference to the spider-arms Z, which arms o co-operate with the arms E² as the latter pass between them in separating the lint from the seed; or, if preferred, the rubber blocks L may be dispensed with and the roughened arms o extend from end to end of the cylinder, as illustrated in Fig. IX. These arms o may be inclined, as shown in Fig. XI, if desired. The cleansed seed is discharged through a suitable spout Q. The ends of the frame are braced and connected by suitable ties R, and are provided with the necessary journal-boxes S and T for the main shaft I and fan-shaft J, respectively. The rubbers M, curved arms Z, and fixed rubbing-surfaces L and o may be inclined obliquely from the feeding to the discharge end of the cylinder in order to cause a gradual longitudinal feed of the material to be effected by the rotation of the shaft and its arms, as shown in Fig. XII.

The staves H, of which the cylinder is made up, may be mounted with a slight space between them to more freely aspirate the interior of the cylinder, giving vent to the fan and causing a more active circulation through the cylinder by which the lint is drawn from the seed as soon as detached by the scouring action. The lint is either blown to a condenser or to a dust-room.

The feed of the machine may be effected by any suitable well-known automatic device regulated as required, and as the seed is carried through the cylinder by the slight incline in the fixed rubbing-faces L or in the blocks M, or both, it is constantly caught by the rotary arms and rubbers, whirled around the cylinders, and quickly cleansed of lint and impurities by the friction, the cleaned seed, the cotton, and the motes and imperfect seed and other impurities being automatically separated and discharged at different places, as above described.

If preferred, a portion of the staves or slats that form the cylinder may be covered with wire-cloth tacked thereon to provide a scouring-surface, as shown in Fig III$^a$. Such wire-covered slats are used at some points within the cylinder where the friction would be too great for the use of emery, as first described. In the drawings it is shown at the feeding end of the cylinder where the broad rubbers M are located.

Having thus described my invention, the following is what I claim as new therein and desire to secure by Letters Patent:

1. A cotton-seed-linting machine constructed, substantially as herein described, with a casing provided with openings for the admission of air, a fan communicating with the interior of the casing, arms or projections fixed within the casing, a rotary shaft carrying arms for producing friction upon the seed in conjunction with the fixed arms or projections, and a suitable feed-hopper and discharge-spout for the seed, said arms being inclined obliquely from the feed to the discharge end of the cylinder, substantially as set forth.

2. The combination of the casing provided with air-openings, a fan communicating with said casing, arms or projections fixed within the casing, and a rotary shaft having arms for co-operating with said fixed arms, said arms being inclined obliquely from the feed to the discharge end of the cylinder, and some of the arms on said rotary shaft being also curved, substantially as set forth.

3. The combination of the cylinder lined at one end with wire-gauze and at the other with emery, the shaft I, journaled in said cylinder, the rubbers M and emery-coated arms E² on said shaft, and the fixed arms o, projecting between the arms E², substantially as set forth.

4. The combination of the cylinder having a shaft therein provided with rotary rubbers, and counterbalanced deflecting-arms mounted on said shaft, substantially as set forth.

5. The combination, with the cylinder C G H and shaft I, carrying rubbing-arms E, of the washers P, having pendent weights N to prevent their rotation with the shaft, and arms o, projecting upward within the cylinder to assist in throwing the cotton toward the periphery and prevent the clogging of the cylinder, as explained.

JAS. J. FAULKNER.

Witnesses:
F. P. POSTON,
D. H. POSTON.